Dec. 14, 1965 R. W. CLARK 3,223,986

MAGNETIC MEMORY CIRCUIT

Filed March 8, 1962 2 Sheets-Sheet 1

INVENTOR
ROBERT W. CLARK

BY Louis A. Kline
J. Hoavender
HIS ATTORNEYS

INVENTOR
ROBERT W. CLARK
BY
Louis A Kline
J Haverder
HIS ATTORNEYS

United States Patent Office 3,223,986
Patented Dec. 14, 1965

3,223,986
MAGNETIC MEMORY CIRCUIT

Robert W. Clark, Centerville, Ohio, assignor to The National Cash Register Company, Dayton, Ohio, a corporation of Maryland Filed Mar. 8, 1962, Ser. No. 178,395
7 Claims. (Cl. 340—174)

Figure 1:
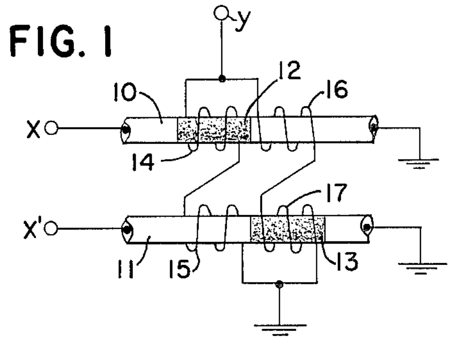

The present invention relates generally to information-handling systems and more particularly relates to a new and improved electrical circuit which is readily adaptable for the storage of binary information utilized by such systems.

Magnetic memory systems now being utilized by high-speed electronic computers and data processors are generally in the form of an orderly array of toroidal ferrite cores, each of which is positioned within the array at an addressable coordinate location. Another magnetic memory element which has achieved prominence in the art is in the form of a magnetic wire within which either a preferred flux path has been established or with which such a preferred flux path has been integrally associated. Such magnetic wire elements are also highly adaptable for organization into coordinate memory arrays and are described in detail in copending United States patent applications Serial No. 696,987, of John R. Anderson and Richard M. Clinehens, filed November 18, 1957, and now U.S. Patent No. 3,042,997; Serial No. 791,695, of Ignatius Tsu, filed February 6, 1959, and now abandoned; and Serial No. 66,610, of Sidney J. Schwartz and William F. Chenoweth, filed November 1, 1960, all of which are assigned to the present assignee, and also in United States patents of Robert D. Fisher et al., No. 2,945,217, issued July 12, 1960, and Dennis Gabor, No. 2,911,317, issued November 3, 1959. In a magnetic wire coordinate array therein described, the wires themselves comprise one set of coordinates, with serially-connected corresponding solenoids coupled to the wires being arranged along the other set of coordinates, the magnetic wires thus comprising highly advantageous and uncomplicated substitutes for the more expensive well-known toroidal core storage elements in magnetic memory arrays.

More specifically, each of such devices preferably comprises an electrically conductive wire having a ferromagnetic coating formed thereon in a manner whereby a preferred direction of magnetization is established therein which is oriented either axially with respect to the longitudinal axis of the device, or at a predetermined angle with respect to its longitudinal axis. Due to the fact that such storage devices have been found to possess substantially high positive and negative magnetic remanence and substantially rectangular hysteresis characteristic along the preferred direction of magnetization, selected length portions of the coating are individually capable of being magnetically saturated in either of two opposite directions along the path of preferred magnetization thereof. Consequently, a magnetizing force of a predetermined critical magnitude, oriented at an angle with respect to the preferred direction of magnetization thereof, is capable of causing selected ones of the length portions to be magnetically switched from one saturation state to the other, whereas a magnetizing force of a magnitude less than the so-called critical requirement produces only negligible changes in the saturation state thereof.

Thus, when a selected length portion of the wire is magnetically saturated in one direction by a magnetizing force greater than the critical value, a remanent flux of one polarity is established in an address segment of the wire along the preferred direction of magnetization and is indicative of either of the two binary digits. Likewise, the remaining binary digit is represented by a remanent flux of the opposite polarity. The value of the binary digit stored in the wire address segment, as determined by the polarity of remanent saturation, is sensed by applying a reading magnetizing force to the wire segment in a given direction. As a result, for one of the binary values a complete traversal of the hysteresis loop by the remanent flux from saturation of one polarity to saturation of the opposite polarity takes place. It is evident that, for the other binary digit representation, the remanent flux is already in the same direction as the magnetizing force tends to effect saturation, and, as a result, no appreciable flux excursion takes place. Output voltage conditions due to flux excursion in the wire segment and induced in the output means inductively coupled to the wire segments are indicative of the particular value of the binary digit stored at the particular address segment.

Generally, a complete flux excursion as described above which results in the generation of an output signal of maximum amplitude is arbitrarily assigned as being indicative of the storage of the binary digit "1." Conversely, when the application of a reading magnetizing force fails to cause an appreciable flux excursion in the wire segment, so that substantially no output voltage is generated, the absence of an output signal is arbitrarily assigned as being indicative of the storage of the binary digit "0."

In the just-described method of sensing the polarity of remanent saturation, it is evident that the wire segment is magnetically saturated in a given direction whether or not the wire segment was already saturated in that particular direction prior to initiation of the reading operation. Consequently, after a reading operation is completed, the state of remanent saturation of the wire segment is no longer indicative of the information just read out unless the remanent saturation is restored to its initial polarity before the reading operation was initiated. This particular method of sensing is normally termed "destructive" read-out. In the so-called "non-destructive" read-out, a magnetizing force is applied to the wire segment at an angle with respect to the easy direction of magnetization thereof and of a magnitude less than the critical amount, whereby a voltage signal is generated by the partial flux excursion and has a polarity which is indicative of the value of the particular binary digit stored therein. For example, an output voltage impulse of positive polarity may arbitrarily be assigned as indicative of the binary digit 1, whereas a voltage impulse of negative polarity is indicative of the binary digit 0.

In each of two cases just described, few problems would appear to arise in distinguishing between the output voltage conditions indicative of respective binary values stored, the easily distinguishable conditions being either the presence or the absence of an output signal, or an output signal having either a positive or a negative polarity respectively representing the two binary values. However, in actual practice such clearly-defined output signals are seldom, if ever, attainable. Spurious or noise output signals are frequently encountered in the operation of most memory arrays, which, at times, are of sufficient amplitude to obscure the character of the output signals. The problem then is to distinguish between an output signal indicative of the value of the binary digit and spurious or noise output signals.

For example, due to the particular physical organization and/or operation of such an array, noise signals may be in the form of either capacitively coupled or inductively coupled noise, or a combination of both. In the construction of one such magnetic wire memory, as disclosed in the previously-referred-to copending United States patent applications, a plurality of memory wires are positioned in a side-by-side relationship and electrically separated from one another. Energizable coils are inductively coupled to a corresponding elemental area of each wire element by encircling each of the corresponding elemental areas with a suitable electrical conducting means, or by a plurality of serially-connected coils, with each coil being inductively coupled to a different one of the elemental areas. When write current pulses are simultaneously applied to selected ones of the memory wires and coils during the write phase of operation, or during the read phase of the operation when read-out signals appear across the ends of the memory wires or across the particular coils coupled thereto, depending upon the particular chosen mode of operation of the memory, interference between adjacent wire elements and/or between the wire element and the coil encircled thereabout is frequently encountered. Additionally, extraneous magnetic fields generated by currents in nearby energized conductors or solenoids or other circuitry may also contribute materially to less than acceptable discrimination between the output signals representing the different binary values. Generally, it has been found that almost any of the various types of noise signals encountered in analogous electronic circuitry may also be encountered in the operation of a memory array of wire elements.

Therefore, it is a primary object of the present invention to devise a new and improved electrical circuit capable of storing binary information.

Another object of the present invention is to improve the signal-to-noise ratio for output signals generated by said electrical circuit.

Still another object of the present invention is to provide for cancellation of capacitively coupled and/or inductively coupled noise generated during the operation of a memory array of magnetic wire type of storage elements.

A further object of the present invention is to devise a new and improved magnetic circuit capable of storing binary information and one which is capable of generating a binary value representation output signal which is an exact representation of the actual flux excursion effected during a read-out operation.

In accordance with the present invention, there has been provided a new and improved electrical circuit which includes a first conductor and a second conductor, with at least one of the conductors having a magnetic flux path capable of assuming two stable remanent flux states and having a remanent flux therein. Means are provided for applying opposite polarity current pulses to each of the conductors, with the current pulse applied to the said one conductor altering the remanent flux therein to generate an output signal having one component related to the flux change in that particular conductor and another component which is related to capacitively coupled noise, and the current pulse which is applied to the remaining conductor generating a cancellation signal which substantially cancels the capacitively coupled noise component of the output signal.

Figure 2:
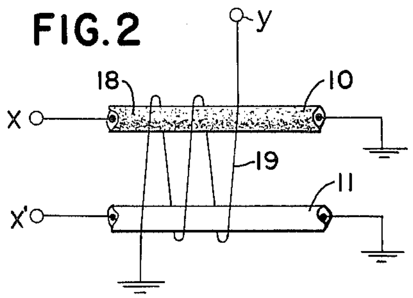
Figure 3:
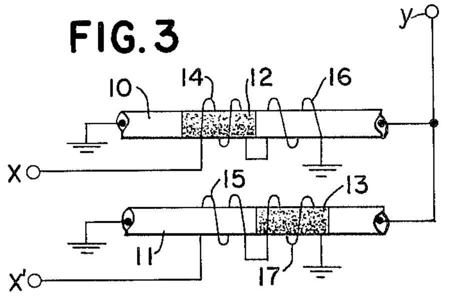
Figure 4:
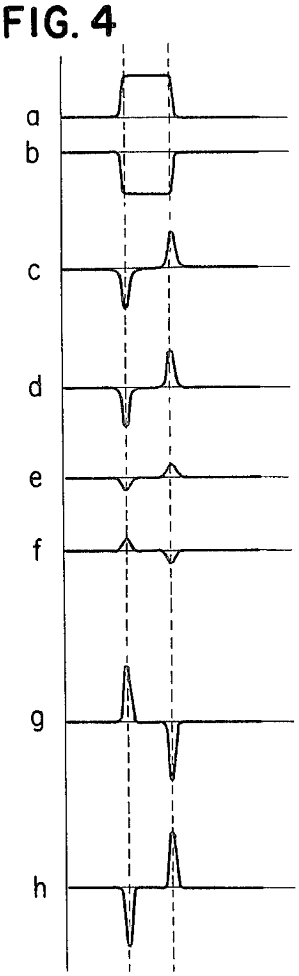
Figure 5:
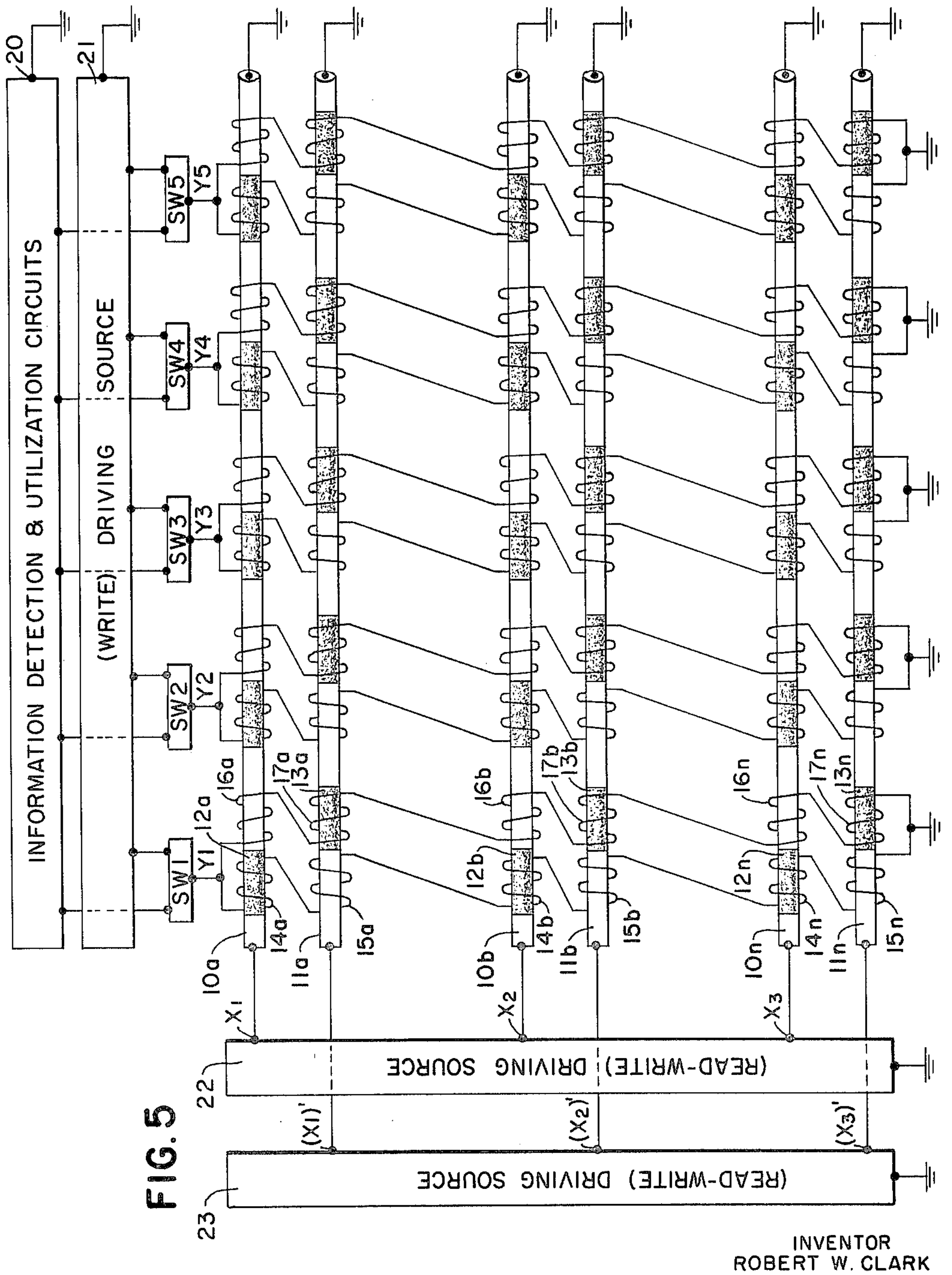

The novel features of the present invention, as well as the invention itself, both as to its organization and as to its mode of operation, will be understood in detail from the following description when considered in connection with the accompanying drawings, in which like or similar reference numerals refer to like or similar elements and in which:

FIG. 1 through 3 schematically illustrate various embodiments of the inventive concept;

FIG. 4 is a diagrammatic illustration of various signal waveshapes useful in understanding the mode of operation of the embodiment of FIG. 1; and FIG. 5 is a schematic representation of a memory array incorporating the inventive concept of the present invention and adaptable for operation as a coincident current memory in present-day electronic computers and data processors.

With reference to FIG. 1, there is schematically illustrated therein one embodiment of the present invention which comprises a pair of wire-like filamentary conductors 10 and 11, which may be either solid or hollow electrically conductive wires having a diameter in the order of 9 mils, or each may be an extremely thin electrically conductive film which is mechanically supported by a core of insulating material such as plastic, glass, ceramic, or the like. Circumferentially formed around the periphery of each of the conductors 10 and 11 is a magnetizable area 12 and 13, respectively, each of which is composed of any suitable ferromagnetic alloy which preferably possesses an easy direction of magnetization which is longitudinally oriented with respect to the central axis of the conductor and additionally possesses a substantially rectangular hysteresis loop characteristic along the easy direction of magnetization, thereby providing each of the conductors with an axially oriented magnetic flux path capable of assuming two stable remanent flux states. While it is preferred that the respective easy direction of magnetization be longitudinally oriented with respect to the axis of the conductor, it will become more apparent hereinafter that the easy direction of magnetization may, if desired, be circumferentially oriented, helically oriented, or inclined at any predetermined angle with respect to the longitudinal axis of the conductor.

The particular method utilized for providing each magnetizable area with a particularly oriented easy direction of magnetization and a substantially rectangular hysteresis loop characteristic along the path of easy direction of magnetization is not critical, and any of the various methods well known in the art, such as, for example, those methods described in detail in the before-referred-to United States patents and patent applications, may be utilized with equal success. Each area of magnetizable material may be selectively deposited onto the conductor by first masking the particular areas desired to be devoid of magnetizable material. Alternatively, however, the entire surface area of the conductor may be covered with a suitably deposited magnetizable material and the undesired portion or portions of the coating thereafter removed in any well-known manner such as by etching, abrasive blasting, grinding, scraping, etc.

An input-output circuit is inductively coupled to the conductors 10 and 11 and consists of a pair of parallel connected electrical branches, with each branch comprising one of a pair of substantially identical, serially connected, plural turn coils 14–15 and 16–17. More specifically, coil 14 is wound about and therefore inductively coupled to area 12 in a predetermined sense. Coil 15 is wound in the same direction about a section of conductor 11 which is devoid of magnetizable material (hereinafter termed "non-magnetizable" area) and is therefore inductively coupled to the non-magnetizable area of conductor 11 in the same sense that coil 14 is inductively coupled to area 12. The lowermost terminating end of coil 15 is returned to a suitable reference potential, such as ground; the uppermost extending end of coil 14 is connected to terminal Y; and the remaining ends of the coils are connected together. Coil 16 is wound in an opposite direction about a non-magnetizable area of conductor 10 and is therefore inductively coupled to conductor 10 in a sense which is opposite from the inductive coupling of coils 14 and 15 to their respective areas. Coil 17 is wound about magnetizable area 13 in the same sense as coil 16 and is therefore inductively coupled to area 13 in a sense which is also opposite from the inductive coupling of coils 14 and 15 to their respective areas. Thus, coils 16 and 17 are coupled in the same sense to their respective areas, each of which senses is opposite with respect to the coupling of coils 14 and 15 to their respective areas. The lowermost terminating end of the coil 17 is returned to ground potential; the uppermost extending end of coil 16 is connected to the terminal Y; and the remaining ends of the coils 16 and 17 are connected together. One end of each of the conductors 10 and 11 is returned to ground potential, and the remaining end thereof is connected to a respective one of input terminals X and X'.

In utilizing the novel circuity of FIG. 1 for the storage of binary information, the binary digits 1 and 0 are individually represented by the establishment of a predetermined polarity of remanent magnetization in each of the magnetizable areas 12 and 13. For example, in order to effect the storage of the binary 1, the digit area 12 is magnetically saturated in a longitudinal direction with respect to the central axis of the conductor 10—i.e., coincidental with the path of preferred magnetization thereof, and in a direction which may be represented by a magnetic vector pointing to the right—and, additionally, magnetizable area 13 is magnetically saturated in a longitudinal direction which may be represented by a magnetic vector pointing in the opposite direction; i.e., to the left. For convenience of description, the establishment of a remanent saturation in area 12 of the just-mentioned polarity will hereinafter be referred to as magnetizing area 12 to the right, and the establishment of the just-mentioned polarity of remanent saturation in area 13 will hereinafter be referred to as magnetizing area 13 to the left.

In summary, the storage of the binary 1 digit is effected by magnetizing area 12 to the right and coincidentally magnetizing area 13 to the left; conversely, the subsequent storage of a binary 0 digit is effected by reversing the polarity of remanent saturation in each of the areas 12 and 13, so that area 12 is magnetically saturated to the left and area 13 is magnetically saturated to the right.

Therefore, if it is desired to store a binary 1 in the novel circuity disclosed in FIG. 1 using well-known coincident current techniques, a positive polarity current pulse of half-select magnitude is applied to conductor 10 via input terminal X, and, coincidentally therewith, a negative polarity current pulse of half-select magnitude is applied to conductor 11 via input terminal X'. After a predetermined delay of approximately .9 microsecond, in order to allow sufficient time for the transient effects caused by the two mentioned half-select currents to subside, a positive polarity current pulse of half-select magnitude is applied to each of the coils 14 through 17 via terminal Y. The two magnetomotive forces produced in the vicinity of magnetizable area 12, due to coincidental energization of conductor 10 and coil 14 with positive-going current pulses, are additive in the region of area 12, so that the vector summation thereof is of sufficient magnitude to saturate area 12 to the right, which, as previously stated, is indicative of binary 1 storage. Likewise, the two magnetomotive forces produced in the vicinity of magnetizable area 13, due to concidental energization of conductor 11 with a negative-going current pulse and coil 17 with a positive-going current pulse, are additive in the region of area 13, so that the vector summation thereof is of sufficient magnitude to saturate area 13 to the left, which, as previously stated, is indicative of binary 1 storage.

From the foregoing, it is evident that binary 0 storage is effected by applying negative-going half-select current pulses to terminals X and Y and coincidentally applying a positive-going half-select current pulse to terminal X', whereby area 12 is magnetized to the left and area 13 is simultaneously magnetized to the right, and that binary 1 storage is effected by applying positive-going half-select current pulses to terminals X and Y and coincidentally applying a negative-going half-select current pulse to terminal X', whereby area 12 is magnetized to the right and area 13 is simultaneously magnetized to the left. In general, thin magnetic films may be produced either by high vacuum evaporation, or by electroless or electrodeposition onto metallic or non-metallic support substrates of a suitable ferromagnetic material such as, for example, 80–20 Ni-Fe alloy. In addition to square-loop properties, these magnetic films are further characterized in that the magnetization prefers to orient either parallel or antiparallel to some direction in the plane of the film. This direction, as previously mentioned, is called the easy axis or the easy direction of magnetization. Through the application of a magnetic field, the magnetization may be induced to switch from one direction along the easy axis to the opposite direction by either one of two modes. The first mode is one in which all elements of the domain reverse simultaneously and is commonly referred to as domain rotation. The field required to induce this mode of reversal is normally called the rotational coercive force. The second mode of magnetization reversal is one in which an area of reversed magnetization grows at the expense of the unreversed area, and the field required to induce this mode of magnetization reversal is normally called the wall motion coercive force. The field required to induce domain wall motion switching is generally much lower than is the field required to induce rotational switching, and the switching which occurs predominately by a wall motion process is usually much slower than rotational switching. Due to the fact that the field required for domain wall motion switching has been observed by those in the art to increase with decreasing film thickness, and that the field required for rotational switching remains relatively constant with a decrease in film thickness, it has been shown that a film may be induced to switch by rotation by making the film sufficiently thin. This method, however, is normally unsatisfactory in actual practice due to the fact that the output signal from a given memory element decreases substantially with a reduction in film thickness.

In the previously-referred-to copending United States patent application Serial No. 791,695, and also in United States Patent No. 3,019,125, issued to John S. Eggenberger et al. on January 30, 1962, there is disclosed one of the various methods of fabricating magnetic thin film memory elements having substantially any desired orientation of preferred direction of magnetization, and also having an increased wall motion coercive force, so that the film is capable of being switched by domain rotation rather than domain wall motion. For a further and more detailed description of magnetic switching phenomena, reference is made to the publications entitled, "Magnetization Reversal and Thin Films," by D. O. Smith, in the March 1958, issued of the Journal of Applied Physics, volume 29, pages 264 to 273, and "Flux Reversal by Noncoherent Rotation in Magnetic Films," by K. J. Harte, in the May 1960, issue of the Journal of Applied Physics, supplement to volume 31, page 283S.

It is, therefore, preferred that the magnetizable areas 12 and 13 be fabricated in accordance with the method disclosed in said copending United States patent application Serial No. 791,695 and said United States Patent No. 3,019,125, by first providing each of the conductors 10 and 11 with a plurality of closely-spaced and parallel grooves or serrations running lengthwise with respect to the conductors, and thereafter depositing thereon an 80–20 Ni-Fe alloy of from 2,000 to 10,000 angstroms thick, so that there is established in each coated area a preferred direction of magnetization which is longitudinally oriented with respect to the conductor, and, additionally, the material is capable of being switched by domain rotation, rather than by domain wall motion. It is, of course, to be understood and appreciated that the present inventive concept is in no way dependent upon the particular switching mode or the particular ferromagnetic alloy utilized, nor whether the switching mode is either partial or complete flux reversal; i.e., non-destructive or destructive read-out.

To read the binary information jointly stored in the magnetizable areas 12 and 13, it is preferred to apply substantially identical but opposite polarity current pulses to the input terminals X and X′ of a magnitude to cause only partial switching of the two areas and of insufficient magnitude to effect a complete flux reversal therein, commonly referred to as non-destructive read-out, whereby the initial polarity of remanent saturation in each of the two areas remains substantially unaltered upon completion of the reading operation. The respective flux excursion in each of the areas 12 and 13 caused by the equal and opposite polarity current pulses applied to the input terminals X and X′ causes to be induced in each of the coils 14 and 17 a voltage signal which is each indicative of the particular binary bit jointly stored in the two areas. Due to the facts that the coils 14 and 17 are connected in parallel, that the flux excursion in area 12 is equal to but of an opposite direction from the flux excursion in area 13, that the coupling and number of turns of coil 14 is preferably equal to the coupling and number of turns of coil 17, and that the winding sense of coil 14 is opposite from the winding sense of coil 17, the read-out signal induced in coil 14 is substantially identical to, and is in phase with, the read-out signal induced in coil 17. Since the wave-shape of the resultant signal appearing at terminal Y is an instantaneous average of the wave-shapes of the signals induced in coils 14 and 17, and since the signal induced in coil 14 has the same wave-shape, amplitude, and phase as the signal induced in coil 17, the resultant signal at terminal Y is identical to each of the two signals induced in the coils 14 and 17.

It has been found in actual practice that the signal induced in a particular coil, such as coil 14 and 17 inductively coupled to a particular magnetizable area such as a respective one of areas 12 and 13 at the time a flux excursion takes place in the respective area, is actually a composite signal having one component determined by the flux excursion in the area, another component generally called capacitive coupled noise which is due to capacitive coupling between the read-out coil and other parts of the magnetic circuit, and still another component generally called inductively coupled noise which is due to inductive coupling between the read-out coil and other parts of the magnetic circuit.

For example, in (*a*) and (*b*) of FIG. 4, there are illustrated representative wave-shapes of the equal and opposite polarity read-out current pulses applied to terminals X and X′, respectively; in (*c*) is a representative wave-shape of the signal component induced in coil 14 as a result of the flux excursion in magnetizable area 12; in (*d*) is a representative wave-shape of the signal component induced in coil 17 as a result of the flux excursion in magnetizable area 13; in (*e*) is a representative wave-shape of the signal component induced in each of coils 14 and 17 due to inductive coupling between the particular coil and other parts of the magnetic circuit; in (*f*) is a representative wave-shape of the signal component induced in each of the coils 15 and 16 due to inductive coupling between the particular coil and other parts of the magnetic circuit; in (*g*) is a representative wave-shape of the signal component induced in each of the coils 14 and 16 due to capacitive coupling between the particular coil and other parts of the magnetic circuit; and in (*h*) is a representative wave-shape of the signal component induced in each of the coils 15 and 17 due to capacitive coupling between the particular coil and other parts of the magnetic circuit.

It is, therefore, evident that in the circuit arrangement shown in FIG. 1 the signal components induced in the coils 14 and 17 as a result of inductively coupled noise effectively cancels the equal and opposite polarity signal components induced in the coils 15 and 16 as a result of inductively coupled noise, and the signal components induced in coils 14 and 16 as a result of capacitively coupled noise effectively cancels the equal and opposite polarity signal components induced in the coils 15 and 17 as a result of capacitively coupled noise. Consequently, due to the identity of amplitude, waveshape, and phase of the signal components induced in the coils 14 and 17 as a result of the flux excursions in the areas 12 and 13, respectively, the waveshape of the read-out signal at terminal Y is determined solely by the flux excursions in the areas 12 and 13 and is substantially free from any capacitively coupled or inductively coupled noise.

In the previously-described example, if the areas 12 and 13 had been storing a binary 0 instead of a binary 1, the negative-going peaks of the waveshapes shown in (*c*) and (*d*) are reversed and positive-going, and the subsequent positive-going peaks become negative-going peaks. In other words, the read-out signal for a binary 1 and for a binary 0 have substantially identical waveshapes, but are 180 degrees out of phase with each other.

In order to detect for a binary 1 or a binary 0, well-known sampling techniques are preferably utilized whereby the read-out signal is sampled at a time coincident with either the positive or the negative peak of the read-out pulse. In this way, it is only necessary that the detection circuitry determine the polarity of the read-out signal in order to distinguish between a binary 1 and a binary 0 storage and is thereby amplitude independent.

With reference to FIG. 2, there is illustrated another circuit arrangement constructed in accordance with the present invention. In this particular embodiment, conductor 10 is provided with a coating 18 of magnetizable material, preferably over its entire surface area, and conductor 11 is completely devoid of any magnetizable material. Additionally, the coils illustrated in FIG. 1 as 14 through 17 are replaced by a single multi-turn coil 19, which is wound about the two conductors. The mode of operation of this particular circuit configuration is substantially the same as previously described with respect to FIG. 1; consequently, a detailed description of the mode of operation of the embodiment shown in FIG. 2 is not believed necessary for a full and complete understanding and appreciation of the various novel aspects of the present invention. Suffice it to say that capacitive noise cancellation is effectively accomplished due to equal and opposite polarity read-out current pulses being applied to input terminals X and X′, and inductive noise cancellation is effectively accomplished due to the fact that coil 19 is inductively coupled in the same sense to conductors 10 and 11, so that substantially equal but opposite polarity inductively coupled noise components are induced in coil 19.

In FIG. 3 there is disclosed still another embodiment, which is substantially the same as the previously-described embodiment of FIG. 1, with the exception that coil 14 is serially connected between coil 16 and input terminal X, and coil 15 is serially connected between coil 17 and input terminal X′. One end of each of the conductors 10 and 11 is returned to ground, and the remaining end of each conductor is connected to terminal Y. In this embodiment, the equal and opposite polarity current pulses energize the coils 14 through 17, rather than the conductors 10 and 11, as in FIG. 1, and the out-put is taken across the conductors 10 and 11, rather than the coils 14 through 17, as in FIG. 1.

The mode of operation of the FIG. 3 embodiment is substantially the same as the mode of operation of the FIG. 1 embodiment, with the exception that it is preferred to operate the embodiment of FIG. 3 in a destructive read-out mode whereby equal and opposite polarity full-select read-out pulses are applied to the input terminals X and X′, so that the polarity of remanent saturation in each of the areas 12 and 13 is reversed due to a complete flux reversal therein. In this instance, the detection circuitry need only be responsive to the presence or absence of an output signal in order to distinguish between the storage of a binary 1 and the storage of a binary 0. Upon completion of the reading operation, it is generally necessary to restore the areas 12 and 13 to their initial polarity of remanent saturation by initiating a subsequent writing operation upon completion of each reading operation, all of which is well known to those skilled in the art.

With reference to FIG. 5, there is diagrammatically illustrated therein a typical magnetic wire memory for use by present-day electronic computers and data processors for data storage purposes and which utilizes a multiplicity of the circuit arrangements previously shown and described with respect to FIG. 1. Such a memory comprises a coordinately arranged array of such bit-storing circuits, with the total number of such circuits arranged in each vertical column being equal to the normally designated word capacity of the memory, and the total number of such circuits arranged in each horizontal row being equal to the maximum bit length of the words to be stored therein. The particular memory chosen for illustrative purposes only is capable of storing a maximum of three words, each word having a maximum length of five binary bits. It is, of course, quite obvious that the storage capacity of such a memory is capable of being expanded simply by increasing the number of bit-storing circuits therein, all in a manner well known to those skilled in the art. As illustrated therein, each of the pairs of coils for each bit-storing circuit is serially connected to the corresponding pair of coils of each adjacent circuit of corresponding bit position, thus providing parallel coil paths between each of the terminals Y1 through Y5 and ground potential.

Each of the terminals Y1 through Y5 is respectively connected to a different one of switching circuits SW1 through SW5, each of which is operative to selectively connect a corresponding one of the terminals Y1 through Y5 either to a suitable driving source 21 or to suitable information detection and utilization circuitry 20, depending upon whether a writing or a reading operation, respectively, is desired. Those conductors of each pair which require the application thereto of positive polarity current driving pulses (i.e., 10*a* through 10*n*) are each connected to a suitable read-write driving source 22, via the terminals X1 through X3, whereas the remaining conductor of each pair which require the application thereto of negative polarity current driving pulses (i.e., 11*a* through 11*n*) are each connected to read-write driving source 23, via terminals $(X_1)'$ through $(X_3)'$.

Each of the driving sources 21, 22, and 23 comprises a circuit which may be of any well-known type capable of providing current pulses of the desired polarity and magnitude; additionally, the switching circuits SW1 through SW5 may be any of the multitude of well-known mechanical, electrical, or electronically operable types capable of selectively connecting a particular circuit to either one of two other circuits; and, further, the information detection and utilization circuits 20 may be of any type well known in the art capable, in this illustrative embodiment of the invention, of accepting two poled output signals of substantially the same absolute magnitude representative of a binary value. Since such circuits are known to one skilled in the art, they need not be herein described in detail for a complete understanding of this invention. For detailed descriptions of typical circuits of these types, reference may be made to any of the various textbooks, such, as for example, the textbook entitled, "Digital Computer Components and Circuits," by R. K. Richards, published by D. Van Nostrand Company, Inc.

While particular embodiments of the invention have been shown and described in detail, it will be obvious to those skilled in the computer art that changes and modifications may be made from the invention in its broader aspects and, therefore, the aim in the appended claims is to cover all such changes and modifications as fall within the true spirit and scope of the invention.

What is claimed is:

1. An electrical circuit comprising:
first and second conductors, one of said conductors having a magnetic flux path capable of assuming two stable remanent flux states and having a remanent flux therein;
output circuit means coupled to both of said conductors;
first energizing means individually coupled to said one conductor;
second energizing means individually coupled to the remaining conductor;
and means for coincidentally applying opposite polarity current pulses to said first and second energizing means, the current pulse to said first energizing means altering the remanent flux in said one conductor to generate in said output circuit means a signal having one component related to the flux change in said one conductor and another component related to capacitively coupled noise, and the current pulse to said second energizing means generating in said output circuit a cancellation signal which substantially cancels said capacitively coupled noise component.

2. An electrical circuit in accordance with claim 1 wherein said flux path is defined by a preferred direction of magnetization longitudinally oriented with respect to said one conductor.

3. An electrical circuit comprising:
first and second conductors, one of said conductors having a magnetic flux path capable of assuming two stable remanent flux states and having a remanent flux therein;
output circuit means comprising a pair of serially connected coils, with each coil being inductively coupled to a different one of said conductors;
and means for applying opposite polarity current pulses to said conductors, the current pulse to said one conductor altering the remanent flux thereof to generate in said output circuit means a signal having one component related to the flux change in said one conductor and another component related to capacitively coupled noise, and the current pulse to the other of said conductors generating in said output circuit a cancellation signal which substantially cancels said capacitively coupled noise component.

4. An electrical circuit comprising:
first and second conductors, one of said conductors having a magnetic flux path capable of assuming two stable remanent flux states and having a remanent flux therein;
output circuit means connecting said conductors in parallel;
a pair of input circuit means, each being individually coupled to a different one of said conductors;
and means for coincidentally applying opposite polarity current pulses to said first and second input circuit means, the current pulse to said first input circuit means altering the remanent flux in said one conductor to generate in said output circuit means a signal having one component related to the flux change in said one conductor and another component related to capacitively coupled noise, and the current pulse to the other of said input circuit means generating in said output circuit a cancellation signal which substantially cancels said capacitively coupled noise component.

5. An electrical circuit comprising:
first and second conductors, each of said conductors having a magnetic flux path capable of assuming two stable remanent flux states and having a remanent flux therein;
output circuit means coupled to both of said conductors;
first energizing means individually coupled to said one conductor;
second energizing means individually coupled to the remaining conductor;

and means for coincidentally applying opposite polarity current pulses to said first and second energizing means.

6. An electrical circuit comprising:

first and second conductors, each of said conductors having a magnetizable area with a remanent flux therein and a non-magnetizable area;

output circuit means comprising a pair of parallel connected branches with each branch comprising a pair of serially connected coils, one of the coils of one branch being inductively coupled in one sense to the non-magnetizable area of said first conductor, the remaining coil of said one branch being inductively coupled in said one sense to the magnetizable area of said second conductor, one of the coils of the remaining branch being inductively coupled in the opposite sense to the magnetizable area of said first conductor, and the remaining coil of said remaining branch being inductively coupled in said opposite sense to the non-magnetizable area of said second conductor;

and means for applying opposite polarity current pulses to said conductors, the current pulse to said first conductor altering the said remanent flux thereof to generate in said output circuit means a first signal having one component related to the flux change in said one conductor, a second component related to inductively coupled noise, and a third component related to capacitively coupled noise, and the current pulse to said second conductor altering the remanent flux thereof to generate in said output circuit means a second signal having one component related to the flux change in said second conductor, a second component which substantially cancels said inductively coupled noise component of said first signal, and a third component which substantially cancels said capacitively coupled noise component of said first signal.

7. An electrical circuit comprising:

first and second conductors, each of said conductors having a magnetizable area with a remanent flux therein and a non-magnetizable area;

output circuit means connecting said conductors in parallel;

a first input circuit means comprising a pair of serially connected coils, one of said coils being inductively coupled in one sense to the magnetizable area of said first conductor, and the remaining coil being inductively coupled in an opposite sense to the non-magnetizable area of said first conductor;

a second input circuit means comprising a pair of serially connected coils, one of said coils being inductively coupled in said one sense to the magnetizable area of said second conductor, and the remaining coil being inductively coupled in said opposite sense to the non-magnetizable area of said second conductor;

and means for applying opposite polarity current pulses to said first and second input circuit means, the current pulse to said first input circuit means altering the remanent flux thereof to generate in said output circuit means a first signal having one component related to the flux change in said one conductor, a second component related to capacitively coupled noise, and a third component related to inductively coupled noise, and the current pulse to said second input circuit means altering the remanent flux thereof to generate in said output circuit a second signal having one component related to the flux change in said second conductor, a second component which substantially cancels said inductively coupled noise component of said first signal, and a third component which substantially cancels said capacitively coupled noise component of said first signal.

References Cited by the Examiner

UNITED STATES PATENTS

| | | | |
|---|---|---|---|
| 3,000,004 | 9/1961 | Weller | 340—174 |
| 3,067,408 | 12/1962 | Barret | 340—174 |

IRVING L. SRAGOW, *Primary Examiner.*

BERNARD KONICK, *Examiner.*